Oct. 26, 1971 W. J. NORTON 3,615,009
CLASSIFYING SYSTEM
Filed March 3, 1969 4 Sheets-Sheet 1

INVENTOR.
WALTER J. NORTON
BY
Brumbaugh, Graves, Donohue and Raymond
his ATTORNEYS

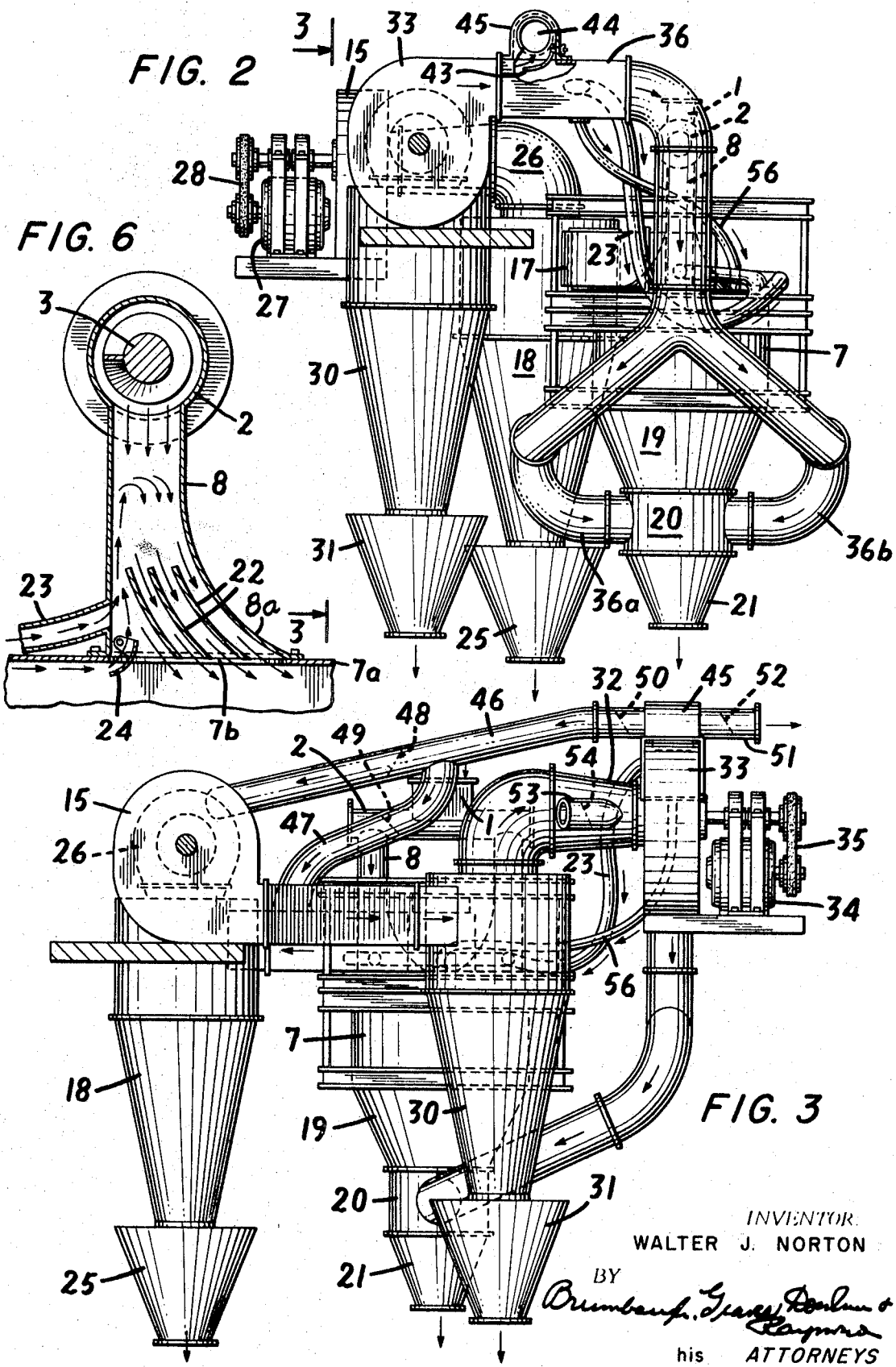

INVENTOR.
WALTER J. NORTON
BY
his ATTORNEYS

United States Patent Office 3,615,009
Patented Oct. 26, 1971

3,615,009
CLASSIFYING SYSTEM
Walter J. Norton, Altamonte Springs, Fla., assignor to
The Georgia Marble Company, Atlanta, Ga.
Filed Mar. 3, 1969, Ser. No. 803,740
Int. Cl. B07b 7/083, 7/10
U.S. Cl. 209—139 A                                    10 Claims

ABSTRACT OF THE DISCLOSURE

A classifying system of the type in which an air stream is recirculated through the system and in which finer particles are separated from coarser particles by being drawn through a particle separator which passes therethrough finer particles while rejecting coarser particles and including a centrifugal separator into which the finer particles are drawn with the stream of air and removed from the system, a first blower for maintaining the centrifugal separator under suction by removing air and ultrafine material therefrom, and a second blower for returning air to an air swirling chamber from which air passes in countercurrent fashion with the coarser particles to separate finer particles therefrom and return them to the particle separator.

---

This invention relates to a novel classifying system for separating the finer and coarser particles of particulate materials.

One of the more effective and successful classifying systems heretofore proposed is shown and described in the Alpha Pat. No. 3,384,238, issued May 21, 1968. In that classifying system the material to be classified is dropped vertically into the outer region of a classifying chamber containing a rotary rejector. The rotary rejector, comprising a cylindrical array of vertically disposed blades, is located centrally within the classifying chamber for rotation on a vertical axis. The suction side of a fan or blower is in communication with the interior of the rotary particle rejector, and the blower draws the finer product through the blades of the rotary rejector to the blower which then discharges the finer product into a centrifugal separator. The coarser product rejected by the blades of the rotary rejector spins downwardly through the bottom of the classifying chamber and is collected separately.

The classifying system described above operates satisfactorily but there is excessive wear on the blower due to the fact that the entire quantity of the finer product passes through the blower. A further disadvantage of passing the entire quantity of finer product through the blower is that there may be a tendency for certain products, depending on atmospheric and other conditions, to stick, flake or build up on surfaces within the blower with the result that they emerge from the blower as undesirable coarse particles. A still further disadvantage of the above-described classifying system is that there is no provision for separating ultrafine material from the finer product.

The principal object of the present invention is to provide a novel and improved classifying system which eliminates the above-described and other disadvantages of heretofore known classifying systems.

The classifying system of the present invention includes a classifying chamber containing a particle separator therein through which finer particles are passed and coarser particles are rejected (that is to say, a particle separator of the type shown and described in the above-identified Alpha patent), a passage for discharging the coarser particles from the classifying chamber, a centrifugal separator under suction and in communication with the particle separator to carry the finer particles with an air stream through the particle separator and into the centrifugal separator wherein they are separated from the system, a first blower having its suction side in communication with the centrifugal separator for conducting air from the centrifugal separator to the blower and for maintaining the desired suction within the centrifugal separator, an air swirling chamber in communication with the path of flow of the coarser particles and a second blower having its suction side in communication with the discharge of the first blower and its discharge side in communication with the air swirling chamber to discharge the desired quantity of air into the swirling chamber from which air passes in countercurrent direction with the coarser particles to separate finer particles therefrom and return them to the particle separator.

In the circulating system of the present invention the air stream which carries the finer particles from the classifying chamber is recirculated through the system to insure that ultrafine material remains within the system until it is ultimately separated either with the finer particles or in a centrifugal separator interposed between the first and second blowers and especially provided for removing the ultrafine material from the system. If a separate centrifugal separator is provided for removing the ultrafine material, the centrifugal separator which is interposed between the classifying chamber and the first blower will also function to separate out the ultrafine material from the finer particles.

A particular advantage of the classifying system of the present invention is that in separating the finer particles from the system in the centrifugal separator interposed between the classifying chamber and the first blower it becomes unnecessary for the finer particles to be handled by or pass through the blower. Inasmuch as only the ultrafine material is handled by the blower, wear on the blower and the likelihood of product build-up on the surfaces of the blower are greatly reduced. Besides, even if there is any product build-up within the blower, any coarse particles resulting from such build-up will not be commingled with the finer product which has already been separated from the system.

An ancillary feature of the classifying system of the present invention is that provision may be made immediately downstream of the second blower for removing any ultrafine material that still accompanies the air stream and to recycle the ultrafine material with a small part of the air stream back through one or both centrifugal separators. To accomplish this purpose the second blower is preferably of a centrifugal type in which the ultrafine material will tend to be displaced outwardly so that it can be removed by an air scoop or diverter which need intercept but a small part of the air discharged from the centrifugal blower.

Other ancillary features of the classifying system of the present invention include the means for predispersing the material before it is introduced into the classifying chamber and for introducing the product into the classifying chamber in a direction having a component which is the same as the direction of the air swirl within the classifying chamber, a novel centrifugal separator for use in the classifying system, a novel air swirling chamber in which returned air is brought into countercurrent flow relation with the coarser particles to remove finer particles therefrom and the provision of reversible air guides or vanes within the air swirling chamber for controlling the direction of swirl of the returned air stream therein.

For a more complete understanding of the present invention reference should be made to the detailed description which follows and to the accompanying drawings in which:

FIG. 2 is a view taken along the line 2—2 of FIG. 1, looking in the direction of the arrows;

FIG. 3 is a view taken along the line 3—3 of FIG. 2, looking in the direction of the arrows;

FIG. 6 is a cross-sectional elevation of one of the passages for introducing material into the classifying chamber and showing the means for predispersing and changing the direction of the material before it is introduced into the classifying chamber;

Figure 1:
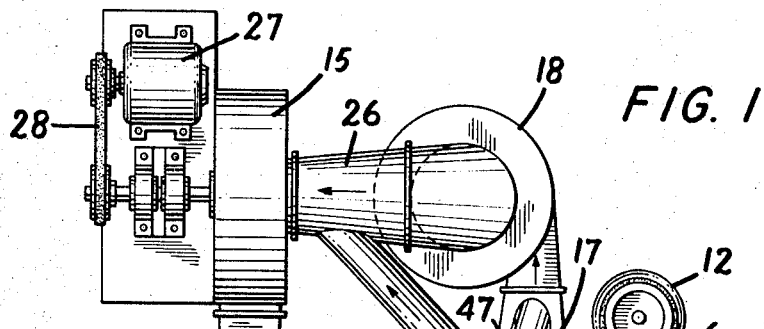
FIG. 1 is a plan view of the classifying system embodying the present inventions.

In the classifying system of the present invention, the particulate material to be classified according to particle size is introduced into the system through a feed inlet 1 which leads into the center of a cylindrical horizontally extending feed tube 2 containing a rotating feed screw 3 therein. The screw threads on opposite sides of the feed inlet 1 are of opposite hand so that the material will be fed through the feed tube 2 in opposite directions. The screw 3 is driven from an electrical motor 4 (see FIG. 4) through a gear reducer 5 and a chain drive 6 which connects the gear reducer and the feed screw 3.

Figure 7:
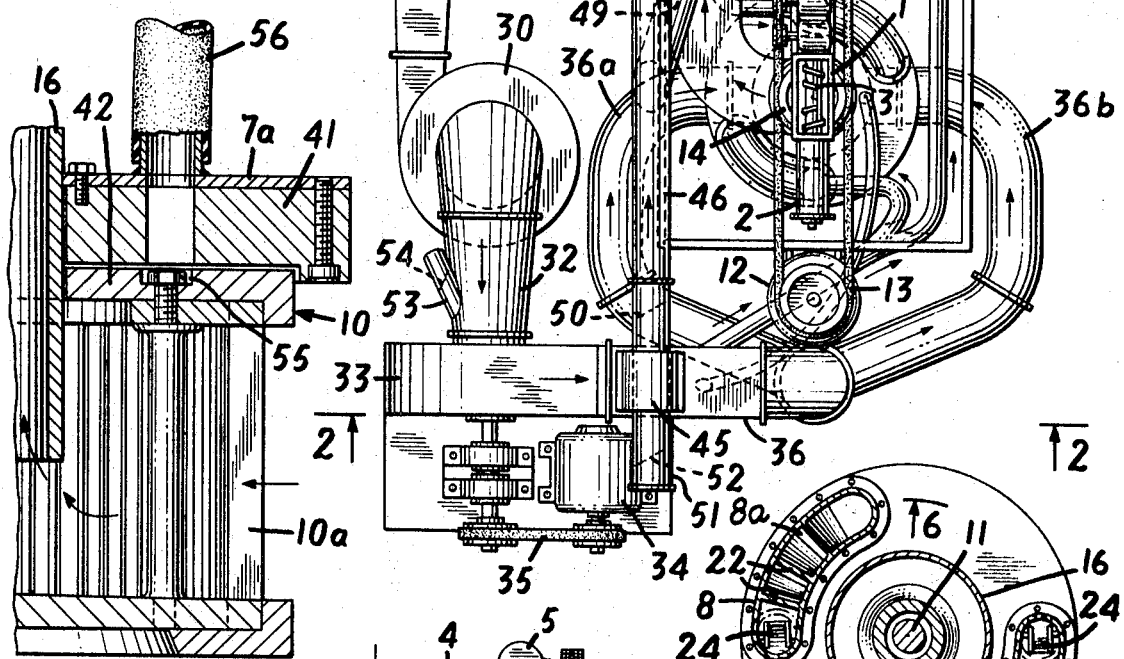
FIG. 7 is a cross-sectional view taken along the line 7—7 of FIG. 5, looking in the direction of the arrows.

The material to be classified is introduced into a classifying chamber within a cylindrical housing 7 through a pair of vertical conduits 8 and 9 which connect the ends of the feed tube 2 with the chamber. The cylindrical classifying chamber contains a rotary particle rejector 10, only partly shown in FIG. 7, of the type shown and described in the above-identified Alpha patent. The rotary rejector is supported within the classifying chamber by a vertically disposed shaft 11 (see FIG. 4) which is driven by a pair of electric motors 12 through belts 13 and a pulley 14 mounted on the upper end of the shaft 11.

The material emerging from the lower ends of the vertical conduits 8 and 9 passes into the outer periphery of the cylindrical classifying chamber, that is to say, into the annular space between the rotary particle rejector 10 and the cylindrical housing 7. The rotary rejector comprises a rotor which operates within the classifying chamber on a vertical axis with the interior of the rotor in communication with a source of suction. The passage from the classifying chamber through the rotor to the source of suction is defined by a cylindrical array of vertically disposed blades 10a (see FIG. 7) which permit passage therethrough of the finer particles but reject the coarser particles. The rotary rejector produces a swirling air current within the classifying chamber so that as the material introduced into the classifying chamber swirls around the rotor the finer particles are carried between the spaces of the cylindrical array of blades of the rotary rejector into the interior thereof from which they are removed from the classifying chamber.

The interior of the rotary particle rejector is in communication with the suction side of a centrifugal blower 15 through a hollow stationary housing 16 which extends upwardly from the interior of the rotary particle rejector, a discharge conduit 17 which conducts the finer particles from the interior of the housing 16, and a centrifugal or cyclone type separator 18 from which the finer particles are removed from the classifying system.

The coarser particles rejected by the blades spin downwardly through the classifying chamber, pass through the bottom thereof, then fall seriatim through a tapered conical section 19, an air return section 20 and a bottom discharge tapered cone 21 through which the coarser particles are removed from the classifying system.

Figure 5:
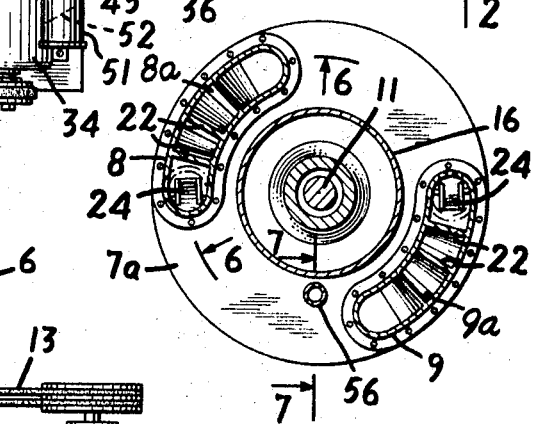
FIG. 5 is a sectional view taken along the line 5—5 of FIG. 4, looking in the direction of the arrows.
Figure 4:
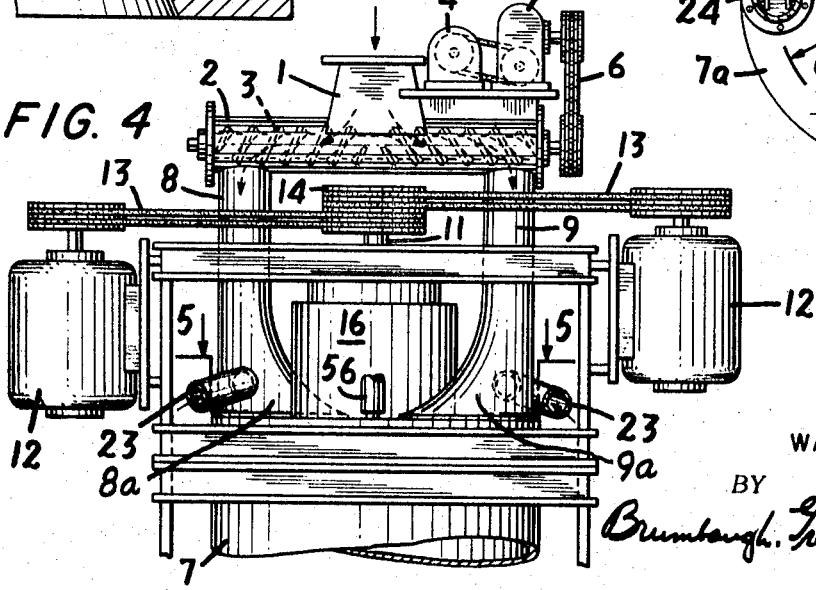
FIG. 4 is an elevational view of part of the classfying system shown in FIG. 1.

It is desirable to predisperse the feed material in order to spread it over a larger area in the classifying chamber within the housing 7. Toward this end, as shown in FIGS. 4, 5 and 6, the lower ends 8a and 9a of the conduits 8 and 9 are enlarged and shaped arcuately in complementary fashion to the arcuate openings 7b in the cover plate 7a of the classifying housing. Moreover, the lower ends of the conduits 8 and 9 contain curved guides or vanes 22 which impart to the failing material a component in the direction of the swirl of the material within the classifying housing 7. Thus, instead of merely dumping the feed material vertically into the classifying housing, the guides or vanes 22 help not only to predisperse the incoming material and introduce it into the chamber over a greater arcuate area, but in addition they direct the flow of the incoming material in the direction of the air swirl within the classifying housing.

To further help in predispersing the feed material before it is introduced into the classifying chamber 7, an upward flow of air can be introduced into the lower ends of the conduits 8 and 9 at the ends of the arcuate discharge openings opposite the direction toward which the material is directed into the classifying chamber by the guides 22. These air streams are directed into the paths of the falling feed material through the conduits 23 which further help to predisperse the material. Also, air scoops 24 can be provided at the lower ends of the conduits 8 and 9 depending into the upper end of the classifying chamber within the housing 7 to scoop up some of the swirling air into the conduits 8 and 9 for the same purpose. The air is preferably introduced into the conduits 8 and 9 behind the guide vanes 22 to help direct the flow of feed material toward the vanes. Since the upper ends of the conduits 8 and 9 are air sealed by the feed material within the feed tube 2, any air introduced into the lower end of the feeder tube will return with the feed material into the classifying chamber within the housing 7.

The stream of air containing the finer particles is directed tangentially into the centrifugal separator for the removal of the finer particles from the system while retaining the air stream in the system with any ultrafine material which is carried along with the air stream. The centrifugal separator 18 can be of conventional design or of the novel design which will be described below in connection with FIG. 8 of the drawings. In a classifying system in which it is desirable to isolate the ultrafine material, the centrifugal separator will be designed for that purpose and only the finer particles will be discharged through the lower discharge end 25 thereof. The ultrafine material will be carried with the flow of air through the conduit 26 which connects the upper end of the centrifugal separator with the suction side of the blower 15. On the other hand, in a classifying system in which no separate centrifugal separator is provided to remove ultrafines from the system, the centrifugal separator will be designed to remove the ultrafine material with the finer particles. Regardless of how the system is designed, it is virtually inevitable that ultrafine material will be carried with the air stream from the centrifugal separator 18 to the blower 15.

The blower is driven by an electric motor 27 through a belt 28. The speed of operation of the blower determines the suction within the centrifugal separator 18.

If the centrifugal separator 18 functions to separate the ultrafine material from the system, there need be no additional separator. However, if the ultrafine material is to be isolated from the finer product, the discharge from the blower 15 will be directed through an air conduit 29 and introduced tangentially into a centrifugal separator 30 similar to the centrifugal separator 18. The ultrafine material is discharged from the lower end 31 of the separator 30, and the air with still a lesser amount of ultrafine material is drawn from the upper end of the separator 30 through a conduit 32 and introduced into the suction side of a centrifugal blower 33.

The blower 33 is driven by an electric motor 34 through a belt drive. The blower 33 discharges air at relatively high pressure and velocity through the air conduit 36 which separates into a pair of conduits 36a and 36b to introduce air through diametrically opposite radial openings into an air swirling chamber of the air return section 20. This returned air dedusts and recovers some finer and lighter material from the coarser and heavier material rejected by the rotary particle rejector within the classifying housing 7. The speed of operation of the blower 33 will be determined by the amount of air which is required for effective dedusting of the coarser material and the requirements of the classifying system.

Figure 10:
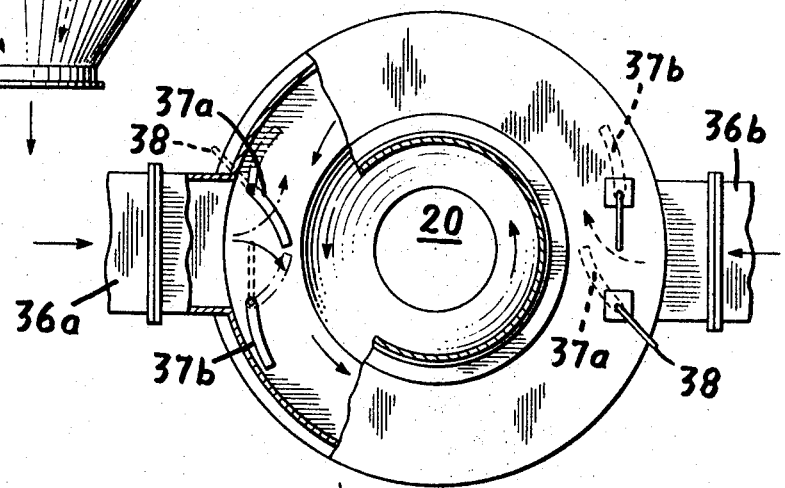
FIG. 10 is a view taken along the line 10—10 of FIG. 9 looking in the direction of the arrows.

The air return section 20 accommodates a pair of adjustable air direction vanes adjacent the discharge ends of the conduits 36a and 36b which permits the direction of swirl of the air within the air return chamber to be reversed. Toward this end a pair of air vanes or deflectors 37a and 37b is positioned within the air swirl chamber adjacent the discharge ends of each of the conduits 36a and 36b. When the vanes 37a are in the operative positions and the vanes 37b are in the inoperative positions, as shown in solid lines in FIG. 10, the air will be swirled in a counterclockwise direction, as viewed in FIG. 10, within the air swirl chamber. On the other hand, when the vanes 37b are in the operative positions and the vanes 37a are in the inoperative positions, as shown in phantom lines in FIG. 10, the air swirl within the chamber will be in the clockwise direction.

Figure 9:
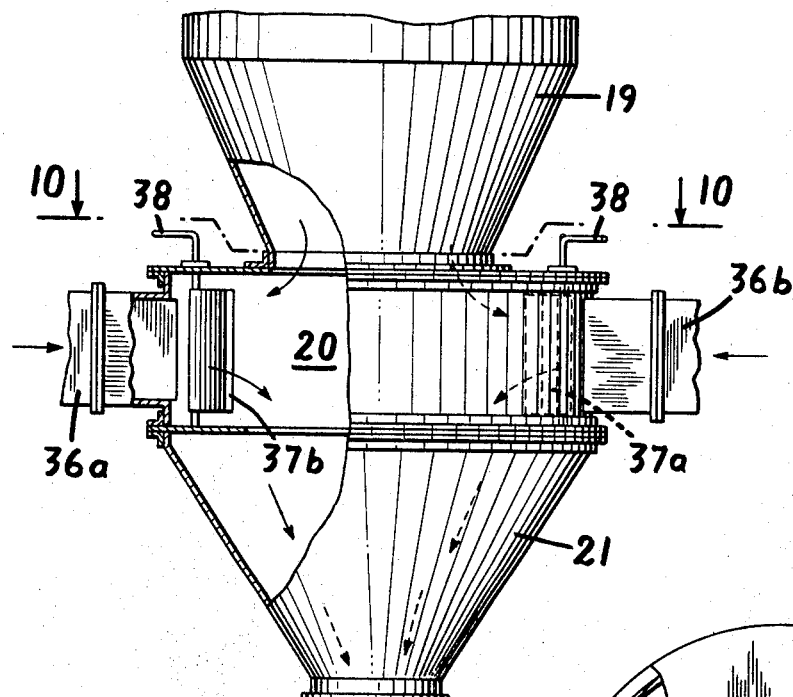
FIG. 9 is an elevational view partly in section showing the means for reversing the direction of swirl in the air return chamber.

Each of the vanes can be adjusted to its proper position by a handle 38 (see FIG. 9), not only for the purpose of reversing the direction of swirl of the air within the chamber 20 but also for the purpose of reversing the intensity of the swirl.

The finer particles recovered from the coarser material are returned upwardly to the classifying chamber within the housing 7 where they may pass through the rotary particle rejector and be collected in one of the centrifugal separators 18 or 30.

Figure 12:
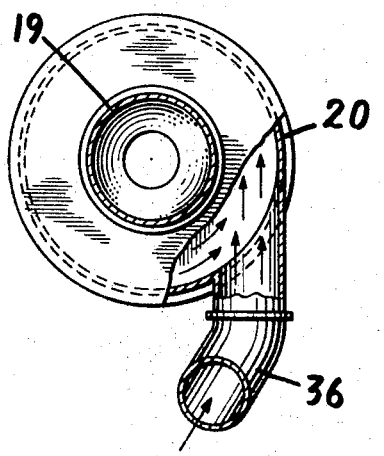
FIG. 12 is a sectional view taken along the line 12—12 of FIG. 11, looking in the direction of the arrows.
Figure 11:
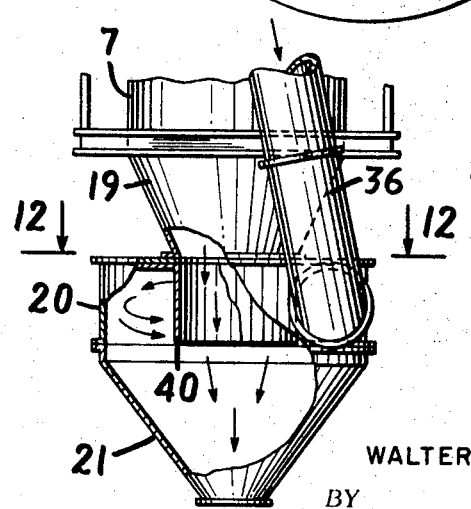
FIG. 11 is an elevational view partly in section showing an alternative structure for an air return chamber.

For some applications a single air return coarse particle deduster can be substituted for the dual air return deduster described above and illustrated in FIGS. 9 and 10. In the single return deduster shown in FIGS. 11 and 12, the conduit 36 introduces air tangentially into the air swirl chamber in the outer periphery of the air return section 20. The coarser product rejected by the rotary particle rejector 10 within the classifying housing 7 passes through the conical section 19, and in passing through the center of the air return section 20 is separated from the swirling air by a cylindrical wall 40. The air in passing upwardly through the passage defined within the wall 40 dedusts the coarser product and returns finer particles separated therefrom to the classifying chamber within the housing 7 where they may be removed through the rotary particle rejector with the finer particle material.

Since the recirculating air stream will ordinarily carry with it some ultrafine material which should be removed from the system, provision is made to remove the ultrafine material before returning the air to the air return section 20. Since the centrifugal blower 33 operates at relatively high speed and tends to displace the ultrafine particles outwardly therein, an air scoop or deflector 43 placed within the discharge conduit 36 to intercept only a small portion of the air discharged from the outer periphery of the housing of the centrifugal blower 33 will carry the ultrafine material into a relief chamber 44 formed within a housing 45 mounted on the conduit 36. The air scooped from the discharge of the blower 33 returns ultrafine material to the centrifugal separator 30, if the system contains a separator for removing ultrafine material therefrom, or to the centrifugal separator 18. If the system includes a centrifugal separator 30 to remove ultrafine material, the relief chamber 44 communicates with a return conduit 46 which returns the scooped off air and any ultrafine particles carried therewith to the suction side of the blower 15 so that the ultrafine particles will be recycled through the centrifugal separator 30 where they may be removed from the system. Also, as best shown in FIG. 1, the conduit 46 is connected by means of a conduit 47 with the upstream side of the centrifugal separator 18 in the event that it is desired to recycle the air through the centrifugal separator 18 or both of the centrifugal separators 18 and 30. The conduits 46 and 47 contain therein gate valves 48 and 49, respectively, located downstream of the juncture of the two conduits so that one of the passages can be closed while the other is open. The conduit 46 also contains a gate valve 50 upstream of the juncture of the conduits to regulate the amount of air returned through the conduit 46.

The opposite side of the relief chamber 44 within the housing 45 is connected by a conduit 51 to a blow-off filter. A gate valve 52 within the conduit 51 permits the amount of air removed from the system to be regulated. Also, an air inlet 53 containing a gate valve 54 therein is provided on the suction side of the blower 33 to regulate the amount of air added to the system. In the classification of heat sensitive products, atmospheric air or cold air can be introduced at this point to reduce the air temperature in the classifying system.

A seal is maintained within the classifying chamber of the housing 7 between the upper end of the housing and the rotary particle rejector 10 by the face-to-face flat surfaces of an annular sealing element 41 mounted to the underside of the cover plate 7a and of an annular sealing element 42 carried by the rotary particle rejector. The upper surface of the sealing element 42 has an annular groove or channel 55 therein to which air is supplied under pressure from the discharge side of the blower 33 through a conduit 56. The sealing air flows from the channel 55 inwardly into the center of the rotary particle rejector 10 which is under suction and outwardly into the higher pressure outer region of the classifying chamber outside the rotary particle rejector. The air entering the seal is under pressure greater than the pressure within the outer region of the classifying chamber, thereby preventing the swirling particulate material therein from being swirled into the seal.

Figure 8:
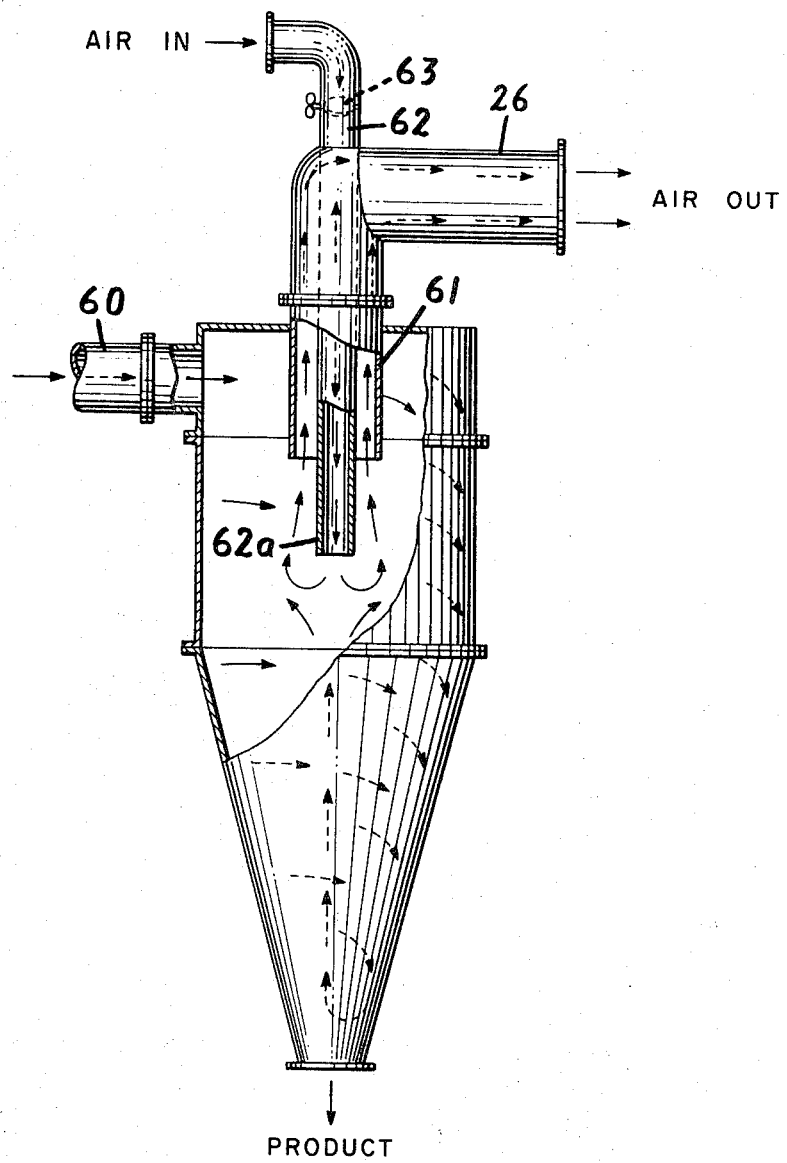
FIG. 8 is an elevational view, partly broken away and partly in section, of a novel centrifugal separator which can be utilized in the classifying system of the present invention.

Although the centrifugal separators 18 and 30 can be of a conventional type, a preferred design is illustrated in FIG. 8 of the drawings. In that centrifugal separator, the finer particles separated out in the classifying chamber are introduced by a conduit 60 tangentially into the upper region of the separator. An annular wall 61 located centrally within the top of the separator defines a discharge passage through which air and ultrafine material are removed from the housing by the suction side of a blower. The wall 61 extends downwardly below the region at which the finer material is introduced into the separator by the conduit 60, thereby defining an outer swirling chamber into which the material is introduced into the separator.

A flow of air can be introduced into the separator from atmosphere or one of the blowers (e.g., from duct 46 via duct 47) through a conduit 62 which passes downwardly through the center of the discharge passage defined by the inside surface of the wall 61 with the lower discharge end 62a thereof extending below the intake end of the conduit defined by the wall 61. The air intake through the conduit 62 can be regulated by a valve 63 therein.

The material introduced into the upper cylindrical portion of the separator will swirl around the outside of the depending wall 61, dispersing the finer particles and the ultrafine material while air is introduced into the center of the cyclone through the conduit 62. Since the annular discharge conduit defined between the conduit 62 and the wall 61 is in communication with the suction side of the blower 15 through the conduit 26, the air flow reverses in direction, carrying the lighter ultrafine material with it into the discharge passage and thence to the suction side of the blower while the heavier fine particles swirl downwardly through the conical lower end of the separator through which they are removed as product from the classifying system.

The efficiency of this separator can be varied in accordance with the desired function of the separator. If it is desired that the separator remove as much of the material as is possible from the system, including the ultrafine material, the separator can be used as a low efficiency separator, in which case the distance which the conduit 62 extends below the wall 61 may be decreased. On the other hand, the efficiency of the separator can be increased by extending the length of the conduit 62 so that it discharges into the separator a greater distance below the annular wall 61.

The provision of the air intake conduit 62 in the centrifugal separator is, of course, optional to its operation. However, it can serve the same purpose as the air inlet 53, that is to say, to regulate the amount of air added to the system and to regulate the amount of atmospheric or cold air introduced to regulate the air temperature within the classifying system. When connected with the discharge of the blower 33 via the ducts 46 and 47, the air may contain ultrafine material scooped from the discharge of the blower 33. Normally the conduits 53 and 62 would not both be used for the intake of atmospheric air into the system at the same time.

The classifying system of the present invention has been shown in preferred forms and by way of example only, and it should be understood that other forms and modifications and variations may be within the spirit of the invention.

I claim:

1. A classifying system in which finer particles are sepaarted from coarser particles comprising a classifying chamber, a particle separator therein which includes a bladed rotor which rejects the coarser particles and passes the finer particles into the interior of the rotor and inlet passage for introducing the particles to be classified into the classifying chamber externally of the rotor, a discharge passage in the lower region of the classifying chamber for discharging the coarser particles from the classifying chamber, a centrifugal separator under suction and in communication with the classifying chamber through the interior of the particle separator to carry the finer particles through the particle separator and into the centrifugal separator wherein they are separated from the system, a first blower having its suction side in communication with the centrifugal separator for conducting air from the centrifugal separator to the blower and for maintaining the desired suction within the centrifugal separator, a second separator communicating with the discharge side of said first blower for separating ultrafine material from the air discharged from the first blower, an air swirling chamber of circular cross-section into which the coarser particles are discharged by the discharge passage and a second blower having its suction side in communication with the second separator and its discharge side in communication with the air swirling chamber to return air circulated through the classifying system and swirl it into the air swirling chamber, the said second blower maintaining the desired pressure within the air swirling chamber to cause the air to flow into the classifying chamber in countercurrent direction to the coarser particles to separate finer particles from the coarser particles and return the finer particles to the particle separator.

2. A classifying system as set forth in claim 1 in which the second blower is of a centrifugal type and any ultrafine material passing therethrough will tend to be carried with the outer portion of the airstream and including a return conduit connecting the discharge side of the second blower with a point in the system upstream of the second separator, and means for scooping out a portion of said outer air stream discharged from the second blower to recycle it and any ultrafine material through said return conduit.

3. A classifying system as set forth in claim 2 in which said return conduit is connected with the system upstream of said first centrifugal separator so that the scooped out air will be recycled through said first and second separators.

4. A classifying system as set forth in claim 1 including a substantially radial inlet opening through which air is admitted into said air swirling chamber from the second blower, and reversible air deflector means within said air swirling chamber and adjacent said radial inlet opening for regulating the direction of flow of the air within said air swirling chamber.

5. A classifying system as set forth in claim 1 in which the swirling chamber is substantially annular and separated from the path of flow of the coarser particles by a depending annular wall having a lower end and including a tangential air inlet into said swirling chamber, and a central passage through which the coarser particles pass after being discharged from the classifying chamber, the passage for the coarser particles and the air swirling chamber being in open communication below the bottom end of the annular wall.

6. A classifying system as set forth in claim 1 in which the classifying chamber is cylindrical and the particle separator swirls the material within the classifying chamber and in which said inlet passage is a vertical conduit for introducing the material to be classified into the upper region of said classifying chamber and having a gradually enlarging lower end in which the material is dispersed and an enlarged arcuate shaped discharge opening through which the material is admitted into an arc of the rotary swirl within the classifying chamber, and guide means within the lower end of said conduit for imparting to the falling material a direction of flow having a component in the direction of the swirl.

7. A classifying system as set forth in claim 6 including means for introducing an upward flow of air into the lower end of said conduit at the end of the discharge opening opposite the direction toward which the material is directed into the classifying chamber by the guide means, thereby helping to predisperse the material.

8. A classifying system as set forth in claim 6 including an air scoop depending from the discharge end of the said conduit into the path of the swirling air in the upper region of the classifying chamber to introduce an upward flow of air into the end of the discharge opening opposite the direction toward which the material is directed by said guide means into the classifying chamber.

9. A classifying system as set forth in claim 1 in which the centrifugal separator includes a cylindrical housing, an annular wall depending from the upper end of said cylindrical housing defining an annular outer passage within the upper region of said housing, a tangential inlet into said annular outer passage for introducing the finer particles in a swirling motion, a conduit within said housing and depending from the upper end thereof and extending below the annular wall for introducing a flow of air into said housing, an annular passage between said conduit and said annular wall in communication with the suction side of the first blower for maintaining the interior of the housing under suction and for withdrawing air and ultrafine material from the cylindrical housing, and a conical shaped lower section of said housing terminating in a restricted discharge passage for removing the finer particles from the classifying system.

10. A classifying system as set forth in claim 1 in which the particle separator is mounted for rotation within the classifying chamber, cooperating flat sealing surfaces sealing the interior of the rotary particle separator which is under suction from the exterior of the particle separator which is at higher pressure, and means for introducing a gaseous fluid under pressure higher than the pressure within the classifying chamber outside the rotary particle separator to prevent passage of the material between said flat sealing surfaces.

References Cited

UNITED STATES PATENTS

| | | | |
|---|---|---|---|
| 2,236,548 | 4/1941 | Prouty | 209—144 X |
| 2,913,112 | 11/1959 | Stavenger et al. | 209—211 |
| 2,939,579 | 6/1960 | Hardinge | 209—144 |
| 3,091,334 | 5/1963 | Morton | 209—211 |
| 3,095,369 | 6/1963 | Jager | 209—144 X |
| 3,384,238 | 5/1968 | Alpha | 209—144 X |

FRANK W. LUTTER, Primary Examiner

R. J. HILL, Assistant Examiner

U.S. Cl. X.R.

209—144